(12) United States Patent
Luk-Zilberman et al.

(10) Patent No.: US 12,346,487 B2
(45) Date of Patent: Jul. 1, 2025

(54) SYSTEM AND METHOD FOR DETECTING CYBERSECURITY VULNERABILITIES VIA DEVICE ATTRIBUTE RESOLUTION

(71) Applicant: Armis Security Ltd., Tel Aviv-Jaffa (IL)

(72) Inventors: Evgeny Luk-Zilberman, Herzliya (IL); Tom Hanetz, Tel Aviv (IL); Ron Shoham, Tel Aviv (IL); Yuval Friedlander, Petah-Tiqwa (IL); Gil Ben Zvi, Hod Hasharon (IL)

(73) Assignee: Armis Security Ltd., Tel Aviv-Jaffa (IL)

( * ) Notice: Subject to any disclaimer, the term of this patent is extended or adjusted under 35 U.S.C. 154(b) by 250 days.

(21) Appl. No.: 17/659,572

(22) Filed: Apr. 18, 2022

(65) Prior Publication Data

US 2023/0336580 A1     Oct. 19, 2023

(51) Int. Cl.
*G06F 21/73*     (2013.01)
*G06F 16/14*     (2019.01)
(Continued)

(52) U.S. Cl.
CPC ............ *G06F 21/73* (2013.01); *G06F 16/152* (2019.01); *G06F 16/2425* (2019.01);
(Continued)

(58) Field of Classification Search
CPC .... G06F 21/73; G06F 16/24578; G06F 21/44; G06F 16/2462; G06F 21/562;
(Continued)

(56) References Cited

U.S. PATENT DOCUMENTS 9,031,087 B2    5/2015  Petrovykh
10,187,369 B2   1/2019  Caldera et al.
(Continued)

FOREIGN PATENT DOCUMENTS

| CN | 104520871 A | * | 4/2015 | ........... G06F 21/577 |
| CN | 110661759 A |   | 1/2020 |                         |
| CN | 112560045 A | * | 3/2021 | ........... G06F 21/562 |

OTHER PUBLICATIONS

Johnson, Daniel. "NLTK Tokenize: Words and Sentences Tokenizer with Example". Updated Mar. 8, 2022. https://www.guru99.com/tokenize-words-sentences-nltk.html.
(Continued)

*Primary Examiner* — Kyung H Shin
(74) *Attorney, Agent, or Firm* — Perkins Coie LLP

(57) ABSTRACT

A system and method for vulnerability detection. A method includes: tokenizing device attribute data for a device into at least one set of first tokens, wherein each of the first tokens is formatted according to a token schema; creating at least one device attribute string, each device attribute string including one of the first tokens; matching each of the at least one device attribute string to combinations of device attributes stored in a vulnerabilities database in order to identify at least one matching combination of device attributes for the device, wherein the vulnerabilities database stores mappings between combinations of device attributes and vulnerabilities, wherein each combination of device attributes in the vulnerabilities database includes second tokens formatted according to the token schema; detecting at least one vulnerability of the device based on the at least one matching combination of device attributes and the mappings in the vulnerabilities database.

11 Claims, 4 Drawing Sheets

(51) Int. Cl.
*G06F 16/242* (2019.01)
*G06F 16/903* (2019.01)
*G06F 21/57* (2013.01)
*H04L 9/32* (2006.01)
*H04L 9/40* (2022.01)

(52) U.S. Cl.
CPC ...... *G06F 16/90344* (2019.01); *G06F 21/577* (2013.01); *H04L 9/3213* (2013.01); *H04L 63/1433* (2013.01)

(58) Field of Classification Search
CPC ............... G06F 21/577; G06F 16/2428; G06F 16/2453; G06F 16/2425; G06F 16/2228; G06F 16/248; G06F 16/152; G06F 16/137; G06F 16/90335; G06F 21/568; G06N 7/01; G06N 5/047; H04L 63/0876; H04L 63/1433; H04L 63/20
See application file for complete search history.

(56) References Cited

U.S. PATENT DOCUMENTS

| | | |
|---|---|---|
| 10,291,635 B2 | 5/2019 | Muddu et al. |
| 10,313,383 B2 | 6/2019 | Sommer |
| 10,419,418 B2 | 9/2019 | Grajek et al. |
| 2014/0173738 A1* | 6/2014 | Condry ................. G06F 21/577 726/25 |
| 2015/0128274 A1 | 5/2015 | Giokas |
| 2018/0309747 A1 | 10/2018 | Sweet et al. |
| 2019/0097907 A1 | 3/2019 | Nickolov et al. |
| 2019/0156042 A1 | 5/2019 | Kim et al. |
| 2019/0288852 A1* | 9/2019 | Shetye ................... G06F 21/73 |
| 2019/0379699 A1 | 12/2019 | Katragadda et al. |
| 2021/0112087 A1 | 4/2021 | Tassoumt et al. |
| 2023/0014556 A1* | 1/2023 | Schuler ................ G06F 16/152 |
| 2023/0090050 A1* | 3/2023 | Kellner ............... G06F 16/2425 707/715 |

OTHER PUBLICATIONS

International Search Report and Written Opinion of corresponding PCT Application No. PCT/IB2023/053857, mailed Jul. 12, 2023, ISA: Israel Patent Office, 9 pages.

* cited by examiner

SYSTEM AND METHOD FOR DETECTING CYBERSECURITY VULNERABILITIES VIA DEVICE ATTRIBUTE RESOLUTION

TECHNICAL FIELD

The present disclosure relates generally to cybersecurity detection, and more specifically to resolving device attributes in order to detect vulnerabilities in devices.

BACKGROUND

Cybersecurity is the protection of information systems from theft or damage to the hardware, to the software, and to the information stored in them, as well as from disruption or misdirection of the services such systems provide. Cybersecurity is now a major concern for virtually any organization, from business enterprises to government institutions. Hackers and other attackers attempt to exploit any vulnerability in the infrastructure, hardware, or software of the organization to execute a cyber-attack.

The ever-increasing utilization of wireless devices and wireless networks poses a real threat to any organization due to vulnerabilities of such devices. Practically any electronic device is now connected indirectly to an organization's devices and systems via these networks. Any vulnerabilities in devices accessing an organization's network can therefore result in harm such as leakage of data or disruption of devices and systems on the network.

Another factor that increases the vulnerability of an organization is the fact that employees or guests often want to use their own devices to access data, some or all of which may be sensitive data. This type of data access using personal devices is typically referred to as bring your own device (BYOD). Of course, devices not setup specifically for the organization can put the organization's sensitive business systems and data at further risk. In particular, users may not be actively checking for potential vulnerabilities of their devices before accessing networks, and therefore may attempt to access the network using vulnerable devices.

To prevent or mitigate harm caused by vulnerable devices accessing a network, many organizations utilize network scanners or other cybersecurity tools configured to monitor network activity and attempt to identify vulnerable devices on the network. These tools may be configured to analyze data related to devices in order to determine if a device has particular hardware or software with known vulnerabilities. However, the device data used for detecting vulnerabilities may be formatted differently, which can result in false negatives in vulnerability detection.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for vulnerability detection. The method comprises: tokenizing device attribute data for a device into at least one set of first tokens, wherein each of the first tokens is formatted according to a token schema; creating at least one device attribute string, each device attribute string including one of the at least one set of first tokens; matching each of the at least one device attribute string to a plurality of combinations of device attributes stored in a vulnerabilities database in order to identify at least one matching combination of device attributes for the device, wherein the vulnerabilities database stores mappings between combinations of device attributes and vulnerabilities, wherein each combination of device attributes in the vulnerabilities database includes a plurality of second tokens formatted according to the token schema; detecting at least one vulnerability of the device based on the at least one matching combination of device attributes and the mappings in the vulnerabilities database.

Certain embodiments disclosed herein also include a non-transitory computer readable medium having stored thereon causing a processing circuitry to execute a process, the process comprising: tokenizing device attribute data for a device into at least one set of first tokens, wherein each of the first tokens is formatted according to a token schema; creating at least one device attribute string, each device attribute string including one of the at least one set of first tokens; matching each of the at least one device attribute string to a plurality of combinations of device attributes stored in a vulnerabilities database in order to identify at least one matching combination of device attributes for the device, wherein the vulnerabilities database stores mappings between combinations of device attributes and vulnerabilities, wherein each combination of device attributes in the vulnerabilities database includes a plurality of second tokens formatted according to the token schema; detecting at least one vulnerability of the device based on the at least one matching combination of device attributes and the mappings in the vulnerabilities database.

Certain embodiments disclosed herein also include a system for vulnerability detection. The system comprises: a processing circuitry; and a memory, the memory containing instructions that, when executed by the processing circuitry, configure the system to: tokenize device attribute data for a device into at least one set of first tokens, wherein each of the first tokens is formatted according to a token schema; create at least one device attribute string, each device attribute string including one of the at least one set of first tokens; match each of the at least one device attribute string to a plurality of combinations of device attributes stored in a vulnerabilities database in order to identify at least one matching combination of device attributes for the device, wherein the vulnerabilities database stores mappings between combinations of device attributes and vulnerabilities, wherein each combination of device attributes in the vulnerabilities database includes a plurality of second tokens formatted according to the token schema; detect at least one vulnerability of the device based on the at least one matching combination of device attributes and the mappings in the vulnerabilities database.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
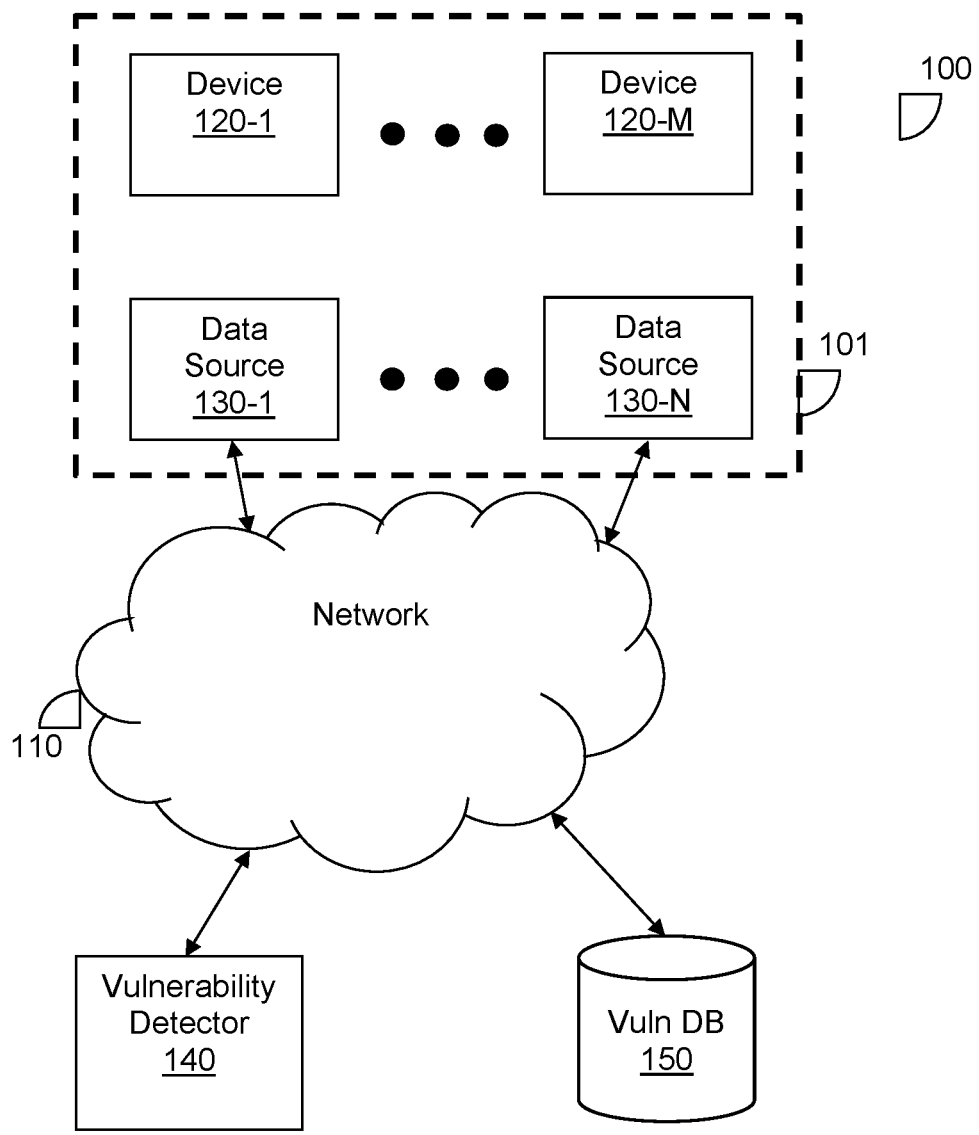
FIG. 1 is a network diagram utilized to describe various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

In light of the challenges noted above, it has been identified that providing a vulnerabilities database with many known vulnerabilities for devices having different combinations of attributes allows for comprehensive vulnerability detection. However, such a vulnerabilities database may not store device attributes in the same format as device attributes output by various cybersecurity tools or otherwise provided by an operator of a network. The number of potential variations of device attributes, as well as the number of potential combinations of device attributes using all of these different variations, is exponential and theoretically infinite.

The various disclosed embodiments include a method and system for detecting vulnerabilities via device attribute resolution. The disclosed embodiments allow for resolving combinations of device attributes between a vulnerabilities database and one or more external sources of device attribute data such that each combination of device attributes can be uniquely identified between the database and external sources. In an embodiment, device attribute data of a device provided by one or more external sources is tokenized into tokens that are formatted in accordance with tokens used by a vulnerabilities database. The vulnerabilities database includes mappings between token strings and known vulnerabilities, where each token string includes a set of tokenized device attributes.

A new token string is created for the device using the tokens created for the device attributes of the device. The new token string is compared to the token strings in the vulnerabilities database in order to determine whether the device is vulnerable. In particular, the device is determined to be vulnerable when the token string for the device matches one of the token strings (i.e., a string of two or more tokens) mapped to a known vulnerability in the vulnerabilities database. In various embodiments, one or more mitigation actions may be performed with respect to vulnerable devices.

The disclosed embodiments improve cybersecurity related to detecting vulnerable devices by resolving device attribute data between different databases, which in turn results in more accurate analysis of combinations of device attributes, leading to fewer false negatives in vulnerability detection. In particular, the disclosed embodiments can be utilized to accurately resolve device attributes even when a cybersecurity tool outputs one or more device attributes in a format that is not reflected in data in the main database.

Moreover, the disclosed embodiments provide techniques that allow for resolving new device attribute data so as to reduce the number of device attributes which need to be stored in the main database as well as the amount of device attribute data that must be compared between the main database and any incoming device attributes in order to resolve device attribute data. This allows for detecting vulnerabilities known for certain combinations of device attributes while minimizing the computing resources utilized for that detection.

FIG. 1 shows an example network diagram 100 utilized to describe the various disclosed embodiments. In the example network diagram 100, data sources 130-1 through 130-N (hereinafter referred to as a data source 130 or as data sources 130) and a vulnerabilities database (Vuln DB) 150 communicate with a vulnerability detector 140 via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

The data sources 130 are deployed such that they can receive data from systems deployed in a network environment 101 in which devices 120-1 through 120-M (referred to as a device 120 or as devices 120) are deployed and communicate with each other, the data sources 130, other systems (not shown), combinations thereof, and the like. Each of the devices 120 may be, but is not limited to, a personal computer, a laptop, a tablet computer, a smartphone, a wearable computing device, or any other device capable of receiving and displaying notifications. The data sources 130 may be, but are not limited to, databases, network scanners, both, and the like.

In some embodiments, the data sources 130 may further include one or more inference generators (not separately depicted) configured to infer, extrapolate, or otherwise determine device attributes based on data from the data sources. Example inference generators which may provide device attributes to be utilized in accordance with the disclosed embodiments are described in U.S. patent application Ser. Nos. 17/523,362 and 17/344,294, both of which are assigned to the common assignee, the contents of both of these applications are hereby incorporated by reference.

Each device 120 has device attributes related to the hardware or software of the device such as, but not limited to, identifier (e.g., a name), model, manufacturer, version, and the like. The device attributes may relate to different hardware or software parts of the device such as, but not limited to, hardware, operating system, applications, and the like. Data collected by or in the data sources 130 may be transmitted to the vulnerability detector 140 for use in resolving device attributes in order to detect vulnerabilities as described herein.

As a non-limiting example, device attributes for one of the devices 120 may include device attributes related to hardware, to the operating system used by the device, and to applications installed on the device. The device attributes related to the hardware may include an identifier "iPhone," model "iPhone 13," and manufacturer "Apple." The device attributes for the operating system may include an identifier "Windows Vista," vendor "Microsoft," version "6.0," update "sp1," edition "North America (NA)," and language "NA." The device attributes for one of the applications may include an identifier "Word," vendor "Microsoft," version "10.2," edition "NA," and language "NA."

The vulnerability detector 140 is configured to resolve device attributes between data provided by the data sources 130 and data stored in a vulnerabilities database 150 as described herein. More specifically, the vulnerability detector 140 is configured to tokenize device attributes indicated by data from the data sources 130 into tokens formatted in accordance with a token schema, and to create device attribute strings using the tokens. The vulnerability detector 140 is further configured to match between the created device attribute strings and combinations of device attributes in the vulnerabilities database 150. To this end, the vulnerabilities database 150 includes combinations of device attributes mapped to respective vulnerabilities (e.g., known common vulnerabilities an exposures, or CVEs). The combinations of device attributes in the database 150 include tokens formatted in accordance with the same token schema used by the vulnerability detector 140 to create tokenized strings.

To aid in tokenization, the vulnerability detector 140 may be configured with one or more tokenizer libraries (not shown). The tokenizer libraries include functions for tokenizing data. A non-limiting example tokenizer library which may be utilized in accordance with various disclosed embodiments is the tokenizer library offered in platforms such as the Python Natural Language Toolkit (NLTK).

It should be noted that the vulnerability detector 140 is depicted as being deployed outside of the network environment 101 and the data sources 130 are depicted as being deployed in the network environment 101, but that these depictions do not necessarily limit any particular embodiments disclosed herein. For example, the vulnerability detector 140 may be deployed in the network environment 101, the data sources 130 may be deployed outside of the network environment 101, or both.

Figure 2:
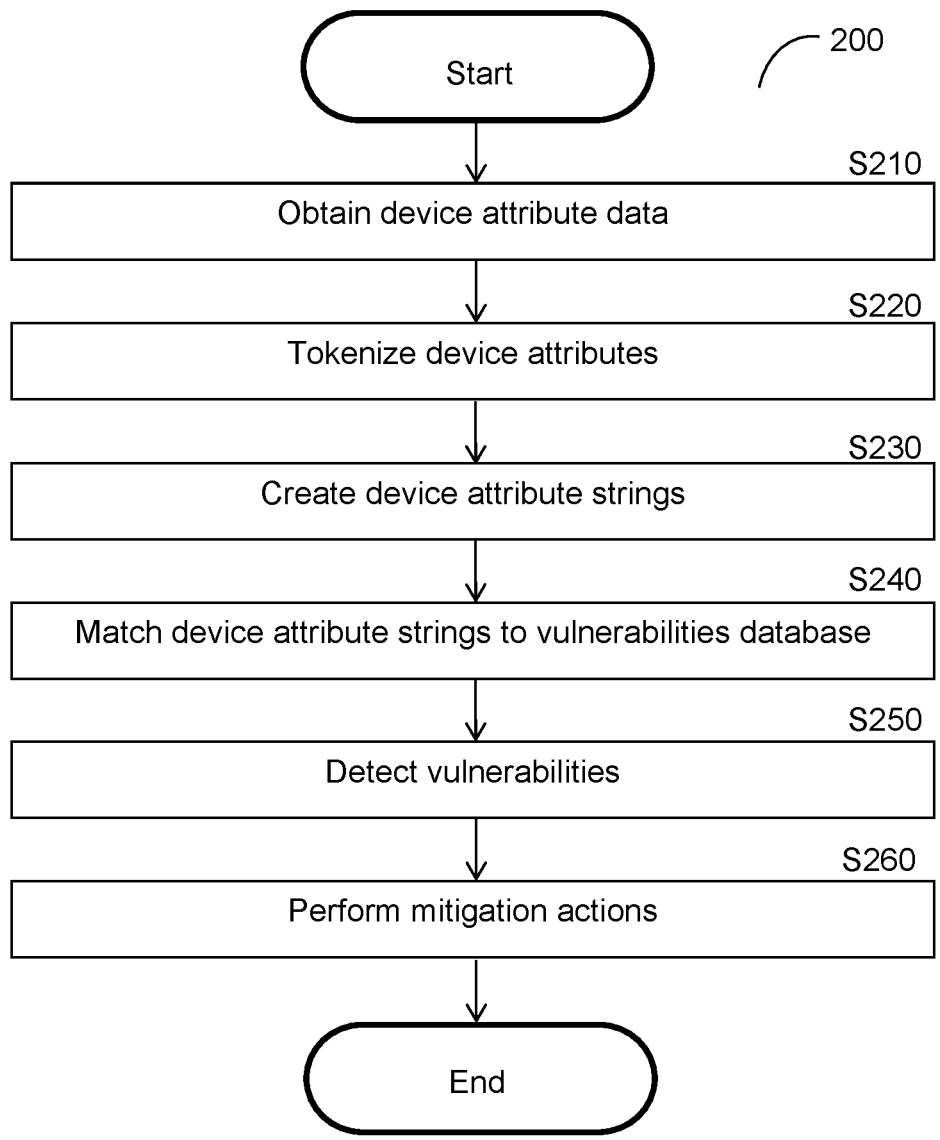
FIG. 2 is a flowchart illustrating a method for detecting vulnerabilities via device attribute resolution according to an embodiment.

FIG. 2 is a flowchart 200 illustrating a method for detecting vulnerabilities via device attribute resolution according to an embodiment. In an embodiment, the method may be performed by the vulnerability detector 140, FIG. 1.

At S210, device attribute data is obtained from one or more data sources. The device attribute data includes multiple device attributes for a given device. The device attribute data may be related to hardware (e.g., the device itself) or software (e.g., the operating system used by the device, applications installed on the device, etc.). The device attribute data is formatted in a manner which may not align with device attributes as represented in a vulnerabilities database, and therefore may not be readily matched to such a vulnerabilities database in their default state.

At S220, device attributes in the device attribute data are tokenized according to a predetermined token schema. In an embodiment, S220 results in tokens representing respective device attributes of the device.

In an embodiment, S220 includes cleaning the device attribute data and applying tokenizer functions in order to result in tokens that uniquely represent different device attributes. In other words, the tokens uniquely represent device attributes such that a given token represents a particular device attribute and only that device attribute (i.e., not other device attributes), regardless of how the data indicating that device attribute is formatted.

Figure 3:
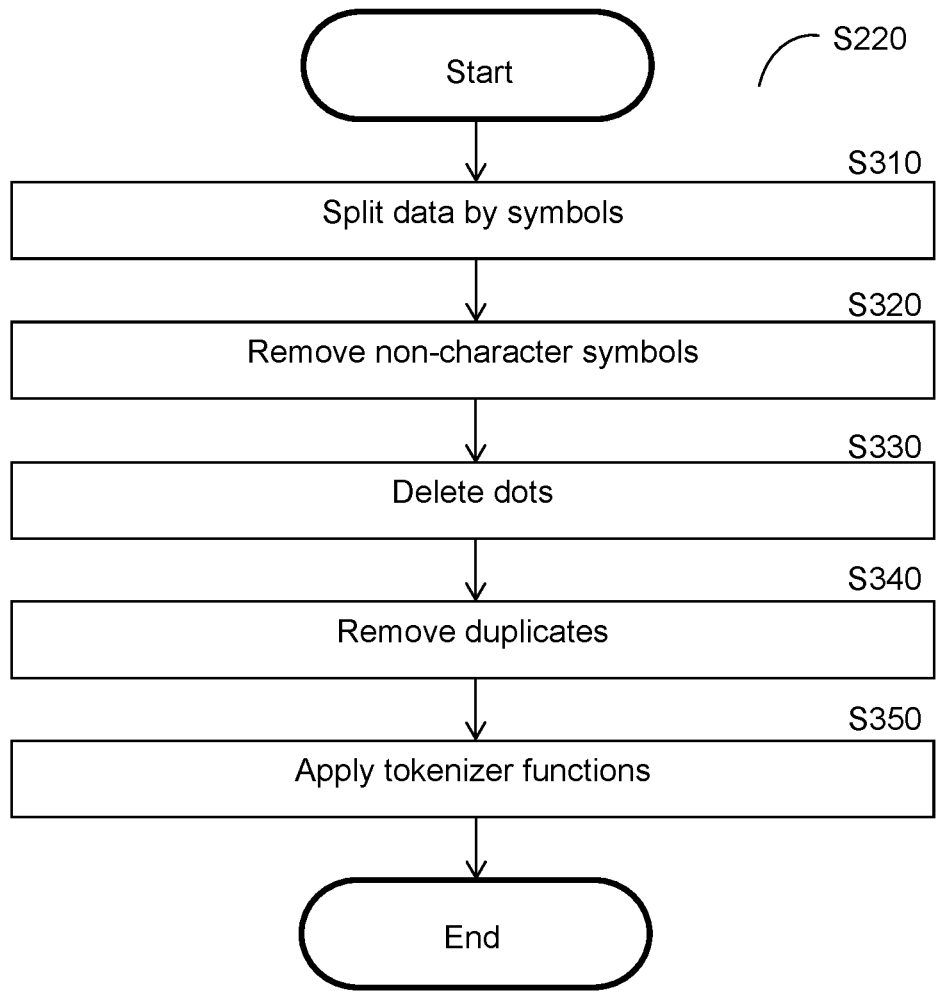
FIG. 3 is a flowchart illustrating a method for tokenizing device attribute data according to an embodiment.

Various example techniques for cleaning the device attribute data and tokenizing the device attribute data are now described with respect to FIG. 3. FIG. 3 is a flowchart S220 illustrating a method for tokenizing device attribute data according to an embodiment.

At S310, the data is split by symbols. To this end, portions of the data having symbols between them may be separated before further processing. Such symbols may include, but are not limited to, "_", "-", ":", "/", "\\", and the like.

At S320, non-character symbols are removed from the data.

At S330, dots or other punctuation are deleted.

At S340, duplicates are removed from the data. Duplicates may be, but are not limited to, identical portions of data.

At S350 tokenizer functions are applied to the data cleaned at S310 through S340 in order to create tokens. The tokenizer functions may be represented in a tokenizer library containing definitions of such tokenizer functions and, when applied, produce tokens formatted according to a token schema. In some embodiments, if a particular device attribute is not represented in the device attribute data (e.g., if the version of an operating system used by the device is not indicated), a null or empty token may be created for that device attribute.

Returning to FIG. 2, at S230, device attribute strings are created for the device based on the tokens created at S220. In an embodiment, each device attribute string corresponds to a respective entity of the device and is a string including a set of tokens representing respective device attributes related to the entity. The entity is an aspect of the device such as, but not limited to, the hardware of the device, an operating system used by the device, or a software application installed on the device. Each entity may have a respective entity type indicating that the entity is hardware, operating system, or application. In a further embodiment, each device attribute string may further include a token indicating the entity type of the corresponding entity.

At S240, the device attribute strings of the device are matched to combinations of device attributes in a vulnerabilities database. The vulnerabilities database maps combinations of device attributes to known vulnerabilities such as, but not limited to, common vulnerabilities and exposures (CVEs). The combinations of device attributes are defined with respect to tokens representing respective device attributes that are formatted according to the token schema used to tokenize the device attributes at S220. In an embodiment, the combinations of device attributes may be stored in the vulnerabilities database as device attribute strings, thereby allowing for comparing the device attribute strings of the device to the device attribute strings of the vulnerabilities database directly. In such an embodiment, the database may store a mapping between device attribute strings and corresponding vulnerabilities.

In an embodiment, S240 includes applying matching rules that define procedures for comparing between device attribute strings and data in the vulnerabilities database. The matching rules to be applied to each device attribute string may be selected based on the type of entity corresponding to the device attribute string. To this end, S240 may further include selecting the matching rules to be applied to each device attribute string, for example, based on a token representing the entity type included in the device attribute string. The matching rules may be in the form of, for example, Boolean statements—if the Boolean statement is true, then there is a match.

As a non-limiting example, for a device attribute string including a token for entity type "application" (i.e., a device attribute string including device attributes related to an application installed on the device), the selected matching rule may be as follows:

(app ID↔string·product) AND (version↔string·version)
    Example 1

In Example 1, a match is determined if both an application identifier Capp ID") of a combination of device attributes matches a "product" token of the device attribute string and a version of the same combination of device attributes matches a "version" token of the device attribute string.

As another non-limiting example, for a device attribute string including a token for entity type "hardware" (i.e., a device attribute string including device attributes related to hardware of the device), the selected matching rules may define different Boolean statements to be used depending on whether a "version" token of the device attribute string is empty. In this example, when the "string.version" for this device attribute string is empty, the following example Boolean statement may be applied:

(manufacturer↔string·vendor) AND
    (model↔string·product) Example 2

In Example 2, a match is determined if both a manufacturer identifier of a combination of device attributes matches a "vendor" token of the device attribute string and a model of the same combination of device attributes matches a "product" token of the device attribute string.

According to the same non-limiting example, when the "string.version" for this device attribute string is not empty (i.e., when there is a non-empty token for the "version" device attribute), the following example Boolean statement may be applied:

(manufacturer↔string·vendor) AND
    (model↔string·product) AND
    (version↔string·version)
    Example 3

In Example 3, a match is determined if all three of the following are true: a manufacturer identifier of a combination of device attributes matches a "vendor" token of the device attribute string, a model of the same combination of device attributes matches a "product" token of the device attribute string, and a version of the same combination of device attributes mentions a "version" token of the device attribute string.

At S250, one or more vulnerabilities of the device are detected based on the matching. Specifically, if a portion or all of one of the device attribute strings of the device match a combination of device attributes mapped to a respective vulnerabilities in the vulnerabilities database, then that vulnerability is detected.

At S260, one or more mitigation actions are performed with respect to the device based on the vulnerabilities detected at S250. The mitigation actions may include, but are not limited to, severing communications between the device and one or more other devices or networks, generating an alert, sending a notification (e.g., to an administrator of a network environment), restricting access by the device, blocking the device (e.g., by adding an identifier of the device to a blacklist), combinations thereof, and the like.

Figure 4:
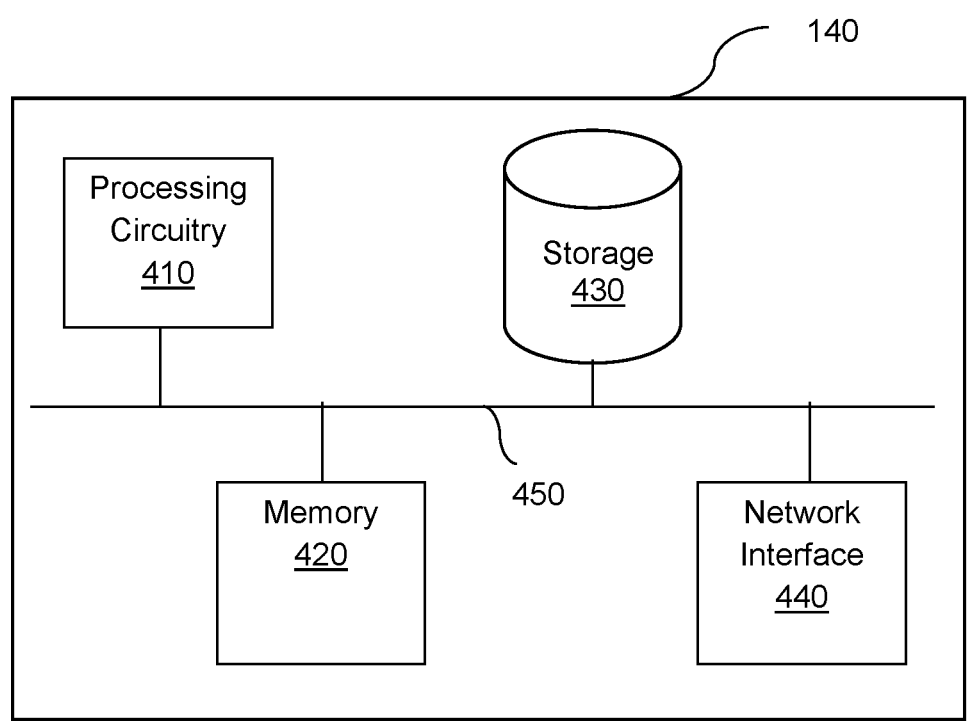
FIG. 4 is an example schematic diagram of a vulnerability detector according to an embodiment.

FIG. 4 is an example schematic diagram of a vulnerability detector 140 according to an embodiment. The vulnerability detector 140 includes a processing circuitry 410 coupled to a memory 420, a storage 430, and a network interface 440. In an embodiment, the components of the vulnerability detector 140 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 420 may be volatile (e.g., random access memory, etc.), non-volatile (e.g., read only memory, flash memory, etc.), or a combination thereof.

In one configuration, software for implementing one or more embodiments disclosed herein may be stored in the storage 430. In another configuration, the memory 420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 430 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 440 allows the vulnerability detector 140 to communicate with, for example, the data sources 130, the vulnerabilities database 150, and the like.

It should be understood that the embodiments described herein are not limited to the specific architecture illustrated in FIG. 4, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for vulnerability detection, comprising:
   obtaining, from one or more data sources, device attribute data, the device attribute data comprising one or more attributes, each attribute related to a hardware type, operating system, or application of a device;
   cleaning the device attribute data by removing non-character symbols, punctuation, and/or duplicate portions of data from the device attribute data;
   tokenizing, using a tokenizer function, the cleaned device attribute data for the device into one or more first tokens, the one or more first tokens formatted according to a token schema, and each first token representing an attribute of the one or more attributes, wherein a null token is created for an attribute that is not included in the obtained device attribute data;
   creating at least one device attribute string based on the one or more first tokens, wherein each of the at least one device attribute string corresponds to a respective entity of the device, wherein each entity of the device has a type selected from: hardware, operating system, or application, and wherein each at least one device attribute string comprises a token indicating the entity type to which the at least one device attribute string corresponds;
   matching, by applying one or more matching rules based on the token indicating the entity type, each of the at least one device attribute string to a combination of device attributes of a plurality of combinations of device attributes stored in a vulnerabilities database, wherein the vulnerabilities database stores mappings between each combination of device attributes of the plurality of combinations of device attributes and one or more vulnerabilities, wherein each combination of device attributes in the vulnerabilities database is defined by a second token formatted according to the token schema; and
   detecting at least one vulnerability of the device based on the matching of the device attribute strong to the combination of device attributes and the corresponding mapping in the vulnerabilities database.

2. The method of claim 1, further comprising:
   performing at least one mitigation action with respect to the device based on the detected at least one vulnerability.

3. The method of claim 1, wherein the at least one device attribute string is at least one first device attribute string, wherein each combination of device attributes in the vulnerabilities database is a second device attribute string.

4. The method of claim 1, wherein the vulnerabilities in the vulnerabilities database are identified by respective common vulnerabilities and exposures identifiers.

5. The method of claim 1, wherein matching each of the at least one device attribute string to the plurality of combinations of device attributes stored in the vulnerabilities database further comprises:
   comparing the set of first tokens included in the device attribute string to each of the plurality of combinations of device attributes.

6. A non-transitory computer readable medium having stored thereon instructions for causing a processing circuitry to execute a process, the process comprising:
   obtaining, from one or more data sources, device attribute data, the device attribute data comprising one or more attributes, each attribute related to a hardware type, operating system, or application of a device;
   cleaning the device attribute data by removing non-character symbols, punctuation, and/or duplicate portions of data from the device attribute data;
   tokenizing, using a tokenizer function, the cleaned device attribute data for the device into one or more first tokens, the one or more first tokens formatted according to a token schema, and each first token representing an attribute of the one or more attributes, wherein a null token is created for an attribute that is not included in the obtained device attribute data;
   creating at least one device attribute string based on the one or more first tokens, wherein each of the at least one device attribute string corresponds to a respective entity of the device, wherein each entity of the device has a type selected from: hardware, operating system, or application, and wherein each at least one device attribute string comprises a token indicating the entity type to which the at least one device attribute string corresponds;
   matching, by applying one or more matching rules based on the token indicating the entity type, each of the at least one device attribute string to a combination of device attributes of a plurality of combinations of device attributes stored in a vulnerabilities database, wherein the vulnerabilities database stores mappings between each combination of device attributes of the plurality of combinations of device attributes and one or more vulnerabilities, wherein each combination of device attributes in the vulnerabilities database is defined by a second token formatted according to the token schema; and
   detecting at least one vulnerability of the device based on the matching of the device attribute strong to the combination of device attributes and the corresponding mapping in the vulnerabilities database.

7. A system for vulnerability detection, comprising:
   a processing circuitry; and
   a memory, the memory containing instructions that, when executed by the processing circuitry, configure the system to:
      obtain, from one or more data sources, device attribute data, the device attribute data comprising one or more attributes, each attribute related to a hardware type, operating system, or application of a device;

clean the device attribute data by removing non-character symbols, punctuation, and/or duplicate portions of data from the device attribute data;

tokenize, using a tokenizer function, the cleaned device attribute data for the device into one or more first tokens, the one or more first tokens formatted according to a token schema, and each first token representing an attribute of the one or more attributes, wherein a null token is created for an attribute that is not included in the obtained device attribute data;

create at least one device attribute string based on the one or more first tokens, wherein each of the at least one device attribute string corresponds to a respective entity of the device, wherein each entity of the device has a type selected from: hardware, operating system, or application, and wherein each at least one device attribute string comprises a token indicating the entity type to which the at least one device attribute string corresponds;

match, by applying one or more matching rules based on the token indicating the entity type, each of the at least one device attribute string to a combination of device attributes of a plurality of combinations of device attributes stored in a vulnerabilities database, wherein the vulnerabilities database stores mappings between each combination of device attributes of the plurality of combinations of device attributes and one or more vulnerabilities, wherein each combination of device attributes in the vulnerabilities database is defined by a second token formatted according to the token schema; and detect at least one vulnerability of the device based on the matching of the device attribute strong to the combination of device attributes and the corresponding mapping in the vulnerabilities database.

8. The system of claim 7, wherein the system is further configured to:

perform at least one mitigation action with respect to the device based on the detected at least one vulnerability.

9. The system of claim 7, wherein the at least one device attribute string is at least one first device attribute string, wherein each combination of device attributes in the vulnerabilities database is a second device attribute string.

10. The system of claim 7, wherein the vulnerabilities in the vulnerabilities database are identified by respective common vulnerabilities and exposures identifiers.

11. The system of claim 7, wherein the system is further configured to:

compare the set of first tokens included in the device attribute string to each of the plurality of combinations of device attributes.

* * * * *